United States Patent
Wilde

(10) Patent No.: US 11,006,719 B1
(45) Date of Patent: May 18, 2021

(54) ELECTRONIC CIGARETTE AND CELLULAR PHONE CASE COMBINATION ASSEMBLY

(71) Applicant: Kenneth Wilde, Greenwood, IN (US)

(72) Inventor: Kenneth Wilde, Greenwood, IN (US)

( * ) Notice: Subject to any disclaimer, the term of this patent is extended or adjusted under 35 U.S.C. 154(b) by 0 days.

(21) Appl. No.: 16/841,338

(22) Filed: Apr. 6, 2020

(51) Int. Cl.
| A24F 15/01 | (2020.01) |
| H04B 1/3888 | (2015.01) |
| A24F 40/40 | (2020.01) |
| A45C 15/00 | (2006.01) |
| A45C 11/00 | (2006.01) |

(52) U.S. Cl.
CPC .............. *A45C 15/00* (2013.01); *A24F 40/40* (2020.01); *A45C 11/00* (2013.01); *H04B 1/3888* (2013.01); *A45C 2011/002* (2013.01)

(58) Field of Classification Search
CPC ....... H04B 1/38; H04B 1/3888; H04M 1/725; H04M 2/10; H02J 7/00; H02J 7/02; H24F 47/00; H24F 47/008; H24F 15/01; H24F 40/40
See application file for complete search history.

(56) References Cited

U.S. PATENT DOCUMENTS

| D705,763 | S | 5/2014 | Fastman | |
| 9,197,726 | B2 * | 11/2015 | Stanimirovic | ........ H04M 1/185 |
| 9,433,242 | B1 | 9/2016 | Buffons | |
| 9,602,646 | B2 * | 3/2017 | Stanimirovic | ....... H04B 1/3888 |
| 9,668,518 | B2 | 6/2017 | Esses | |
| 9,894,938 | B2 | 2/2018 | Vick | |
| 10,003,372 | B2 * | 6/2018 | Stanimirovic | ....... H04B 1/3883 |
| 10,396,575 | B2 * | 8/2019 | Stanimirovic | ........ H02J 7/0044 |
| 2015/0102940 | A1 * | 4/2015 | Keech | .................. H04B 5/0031 340/870.02 |
| 2016/0345628 | A1 | 12/2016 | Saber | |
| 2017/0360090 | A1 | 12/2017 | Grossfeld | |
| 2019/0173508 | A1 | 6/2019 | Martin | |
| 2019/0281893 | A1 | 9/2019 | Valdez-Gibson | |

* cited by examiner

*Primary Examiner* — Blane J Jackson

(57) ABSTRACT

An electronic cigarette and cellular phone case combination assembly includes a case to receive and protect a cellular phone. The case includes a panel having an inner surface, an outer surface and a perimeter edge. The perimeter edge includes a top edge, a bottom edge, a first side edge and a second side edge. A perimeter wall is attached to and is coextensive with the perimeter edge. The perimeter wall extends forward of the inner surface. An electronic cigarette is attached to the outer surface of the panel.

7 Claims, 3 Drawing Sheets

ELECTRONIC CIGARETTE AND CELLULAR PHONE CASE COMBINATION ASSEMBLY

The disclosure relates to phone protection device and more particularly pertains to a new phone protection device which also includes an electronic cigarette to prevent a person from having to hold two articles.

DESCRIPTION OF RELATED ART INCLUDING INFORMATION DISCLOSED UNDER 37 CFR 1.97 AND 1.98

The prior art relates to phone protection devices which are mounted on a cellular phone to protect the phone from damage.

BRIEF SUMMARY OF THE INVENTION

An embodiment of the disclosure meets the needs presented above by generally comprising a case configured to receive and protect a cellular phone. The case includes a panel having an inner surface, an outer surface and a perimeter edge. The perimeter edge includes a top edge, a bottom edge, a first side edge and a second side edge. A perimeter wall is attached to and is coextensive with the perimeter edge. The perimeter wall extends forward of the inner surface. An electronic cigarette is attached to the outer surface of the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
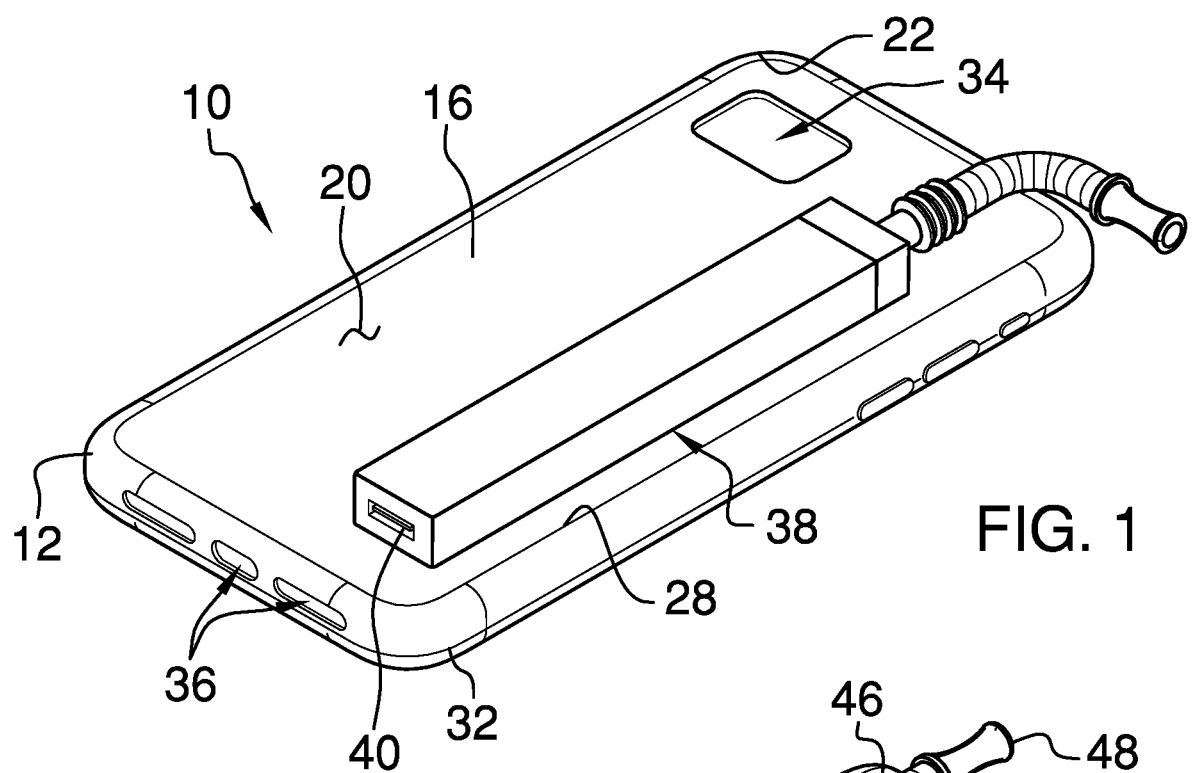
FIG. 1 is a rear isometric view of an electronic cigarette and cellular phone case combination assembly according to an embodiment of the disclosure.
Figure 2:
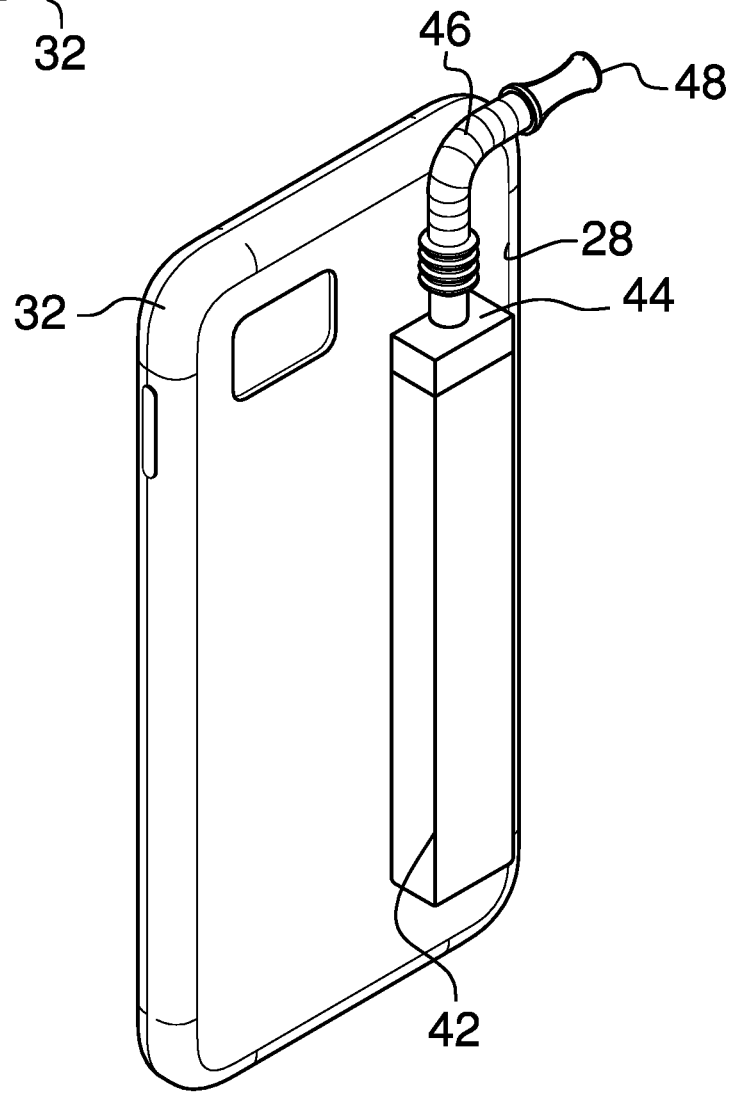
FIG. 2 is a rear isometric view of an embodiment of the disclosure.
Figure 3:
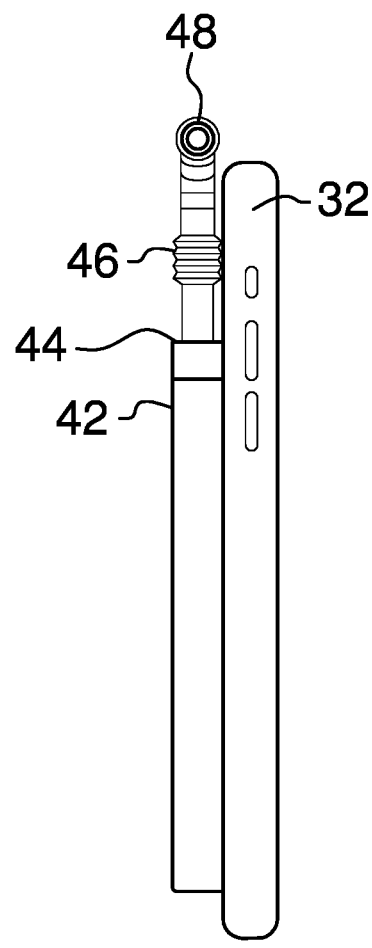
FIG. 3 is a side view of an embodiment of the disclosure.
Figure 4:
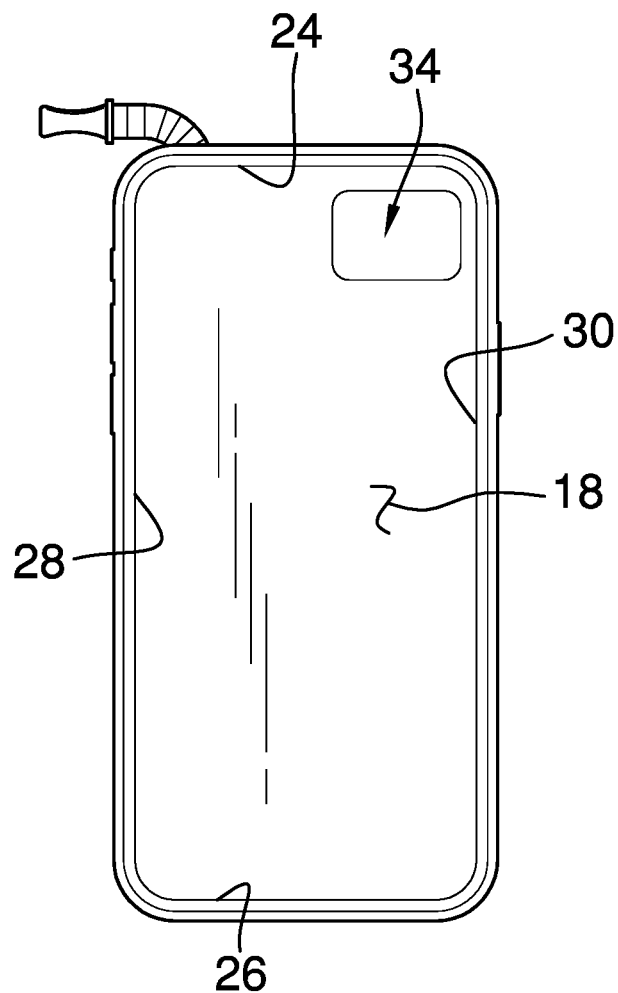
FIG. 4 is a front view of an embodiment of the disclosure.
Figure 5:
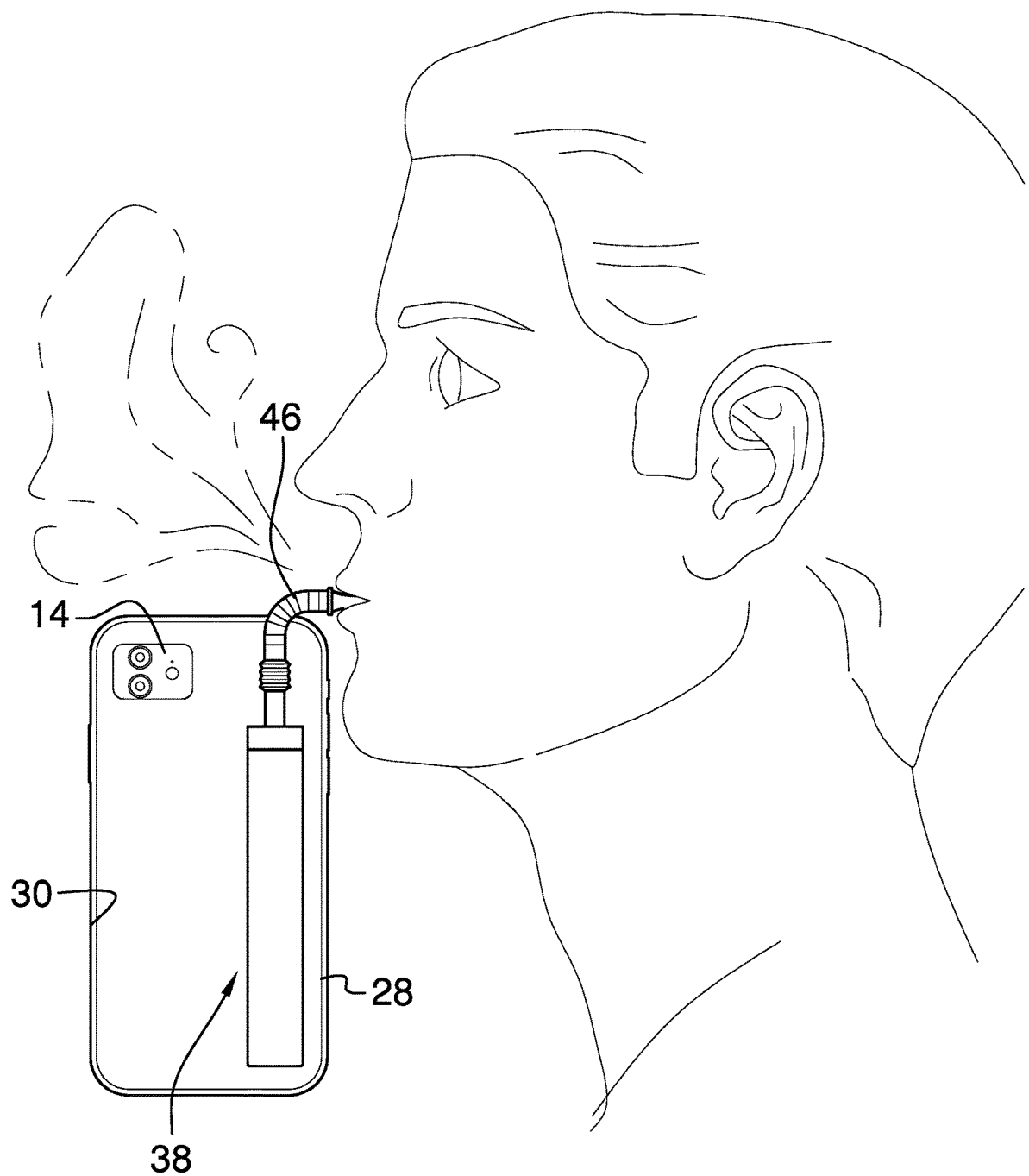
FIG. 5 is a rear in-use view of an embodiment of the disclosure.

With reference now to the drawings, and in particular to FIGS. 1 through 5 thereof, a new phone protection device embodying the principles and concepts of an embodiment of the disclosure and generally designated by the reference numeral 10 will be described.

As best illustrated in FIGS. 1 through 5, the electronic cigarette and cellular phone case combination assembly 10 generally comprises a case 12 configured to receive and protect a cellular phone 14. The case 12 includes a panel 16 has an inner surface 18, an outer surface 20 and a perimeter edge 22. The perimeter edge 22 includes a top edge 24, a bottom edge 26, a first side edge 28 and a second side edge 30. A perimeter wall 32 is attached to and is coextensive with the perimeter edge 22. The perimeter wall 32 extends forward of the inner surface 18. An opening 34 extends through the panel 16 and is used for the camera and light of the cellular phone 14. The opening 34 is positioned nearer to the top edge 24 than the bottom edge 26. The perimeter wall 32 has a plurality of apertures 36 extending therethrough for allowing sound from the cellular phone 14 to travel through the case 12. Generally, the case 12 is conventional to cellular phone covers/protection devices and comprised of plastics, elastomers, metals, and other similar materials.

An electronic cigarette 38 is attached to the outer surface 20 of the panel 16. The electronic cigarette 38 is a conventional structure used for delivering an aerosol of an atomized liquid solution which may include flavorings, nicotine and other solutions. Often called a "vape-pen," such devices commonly include a power source, atomizer, chamber for holding oils or extract that will be vaporized. A power port 40 is used to recharge the power source which typically includes a rechargeable battery.

In one embodiment, the electronic cigarette 38 includes a housing 42 that has a longitudinal axis oriented parallel to the first side edge 28. The housing 42 has an upper edge 44 that is positioned adjacent to the top edge 24. The housing 42 is positioned nearer to the first side edge 28 than the second side edge 30. An exhaust tube 46 is fluidly coupled to electronic cigarette 38 and extends upwardly from the upper edge 44. A mouth piece 48 is fluidly coupled to the exhaust tube 46 distal to the housing 42. The mouth piece 48 extends beyond the perimeter edge 22. The housing 42 may be non-removably coupled to the case 12 and may be a unitary structure with the case 12.

In use, a cellular phone 14 is positioned against the inner surface 18 such that perimeter wall 32 engages the cellular phone and holds the cellular phone 14 in place. The electronic cigarette 38 is used in a conventional manner while the tube 46 moves the mouth piece 48 away from the case 12 such that it can be easily accessed by a user of the of assembly 10. The combination allows a person to hold a single object as opposed to having to hold and/or store two separate objects.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone protection and inhalable aerosol delivery system combination, the combination comprising:
   a case configured to receive and protect a cellular phone, the case including a panel having an inner surface, an outer surface and a perimeter edge, the perimeter edge including a top edge, a bottom edge, a first side edge and a second side edge, a perimeter wall being attached to and being coextensive with the perimeter edge, the perimeter wall extending forward of the inner surface;
   an electronic cigarette being attached to the outer surface of the panel, wherein the electronic cigarette includes a housing having a longitudinal axis oriented parallel to the first side edge, the housing being positioned nearer to the first side edge than the second side edge; and
   an exhaust tube being fluidly coupled to electronic cigarette and extending upwardly from the electronic cigarette, the exhaust tube being L-shaped having a proximal section relative to the housing and a distal section relative to the housing, the proximal section being parallel to the longitudinal axis, the distal section being perpendicular to the longitudinal axis such that the distal section of the exhaust tube extends towards the first side edge; and
   a mouth piece being fluidly coupled to the exhaust tube distal to the housing, the mouthpiece being positioned to extend outwardly from the first side edge of the case wherein the mouthpiece is configured to be accessible to an upright oriented head while the case is held in an upright orientation.

2. The phone protection and inhalable aerosol delivery system combination according to claim 1, wherein an opening extends through the panel, the opening being positioned nearer to the top edge than the bottom edge, the perimeter wall having a plurality of apertures extending therethrough.

3. The phone protection and inhalable aerosol delivery system combination according to claim 1, wherein the housing has an upper edge being positioned adjacent to the top edge.

4. The phone protection and inhalable aerosol delivery system combination according to claim 1, wherein the mouth piece extends beyond the perimeter edge, the housing being non-removably coupled to the case.

5. The phone protection and inhalable aerosol delivery system combination according to claim 3, further including an exhaust tube being fluidly coupled to electronic cigarette and extending upwardly from the upper edge, a mouth piece being fluidly coupled to the exhaust tube distal to the housing.

6. The phone protection and inhalable aerosol delivery system combination according to claim 1, wherein the housing is non-removably coupled to the case.

7. A phone protection and inhalable aerosol delivery system combination, the combination comprising:
   a case configured to receive and protect a cellular phone, the case including a panel having an inner surface, an outer surface and a perimeter edge, the perimeter edge including a top edge, a bottom edge, a first side edge and a second side edge, a perimeter wall being attached to and being coextensive with the perimeter edge, the perimeter wall extending forward of the inner surface, an opening extending through the panel, the opening being positioned nearer to the top edge than the bottom edge, the perimeter wall having a plurality of apertures extending therethrough; and
   an electronic cigarette being attached to the outer surface of the panel, the electronic cigarette including a housing having a longitudinal axis oriented parallel to the first side edge, the housing having an upper edge being positioned adjacent to the top edge, the housing being positioned nearer to the first side edge than the second side edge, an exhaust tube being fluidly coupled to electronic cigarette and extending upwardly from the upper edge, the housing being non-removably coupled to the case, the exhaust tube being L-shaped having a proximal section relative to the housing and a distal section relative to the housing, the proximal section being parallel to the longitudinal axis, the distal section being perpendicular to the longitudinal axis such that the distal section of the exhaust tube extends towards the first side edge; and
   a mouth piece being fluidly coupled to the exhaust tube distal to the housing, the mouthpiece being positioned to extend outwardly from the first side edge of the case wherein the mouthpiece is configured to be accessible to an upright oriented head while the case is held in an upright orientation.

* * * * *